United States Patent [19]

Nakamizo

[11] 4,226,432
[45] Oct. 7, 1980

[54] DEVICE FOR SEALING ELECTRIC WIRES

[75] Inventor: Keiichi Nakamizo, Himeji, Japan

[73] Assignee: Kawasaki Jukogyo Kabushiki Kaisha, Kobe, Japan

[21] Appl. No.: 5,136

[22] Filed: Jan. 22, 1979

[30] Foreign Application Priority Data

Jan. 31, 1978 [JP] Japan .............................. 53-10887[U]

[51] Int. Cl.³ .............................................. F16J 15/10
[52] U.S. Cl. ........................... 277/212 F; 174/65 SS; 174/152 G; 277/110; 285/115; 339/101
[58] Field of Search ................. 174/65 SS, 77 R, 151, 174/152 R, 152 G, 167; 339/101, 94 R, 94 A, 94 M; 277/4, 12, 101, 102, 110, 111, 112, 104–109, 113–117, 212 F; 285/115, 116, 354

[56] References Cited

U.S. PATENT DOCUMENTS

| 1,574,020 | 2/1926 | Black et al. ........................ 339/101 X |
| 3,023,266 | 2/1962 | Friedman ........................ 174/77 R X |
| 3,040,284 | 6/1962 | Connell ........................ 174/77 R X |
| 4,161,156 | 7/1979 | Sato et al. ...................... 174/65 SS X |

FOREIGN PATENT DOCUMENTS

| 481856 | 3/1952 | Canada .................................. 174/77 R |
| 850593 | 9/1939 | France .................................. 174/77 R |
| 645797 | 11/1950 | United Kingdom .................. 174/77 R |
| 666157 | 2/1952 | United Kingdom .................. 174/77 R |
| 726515 | 3/1955 | United Kingdom .................. 174/77 R |

OTHER PUBLICATIONS

Knight, R. D., "Vacuum Feed-Through Bushing", *IBM Technical Disclosure Bulletin*, vol. 2, No. 4, Dec. 1959, p. 9.

Primary Examiner—Laramie E. Askin
Attorney, Agent, or Firm—Merriam, Marshall & Bicknell

[57] ABSTRACT

A device for sealing electric wires is disclosed comprising a cap screw threadedly attached to an opening in a casing of a system or apparatus, and a flexible sealing member extending from the interior of the cap screw longitudinally outwardly thereof and having bores therein through which the wires pass. Each of the bores has different diameter portions, i.e. the same as the diameter of the wire in an inner portion of the sealing member within the cap screw, and greater diameter in an outer portion thereof in order to prevent the wires from being broken due to vibrations.

6 Claims, 6 Drawing Figures

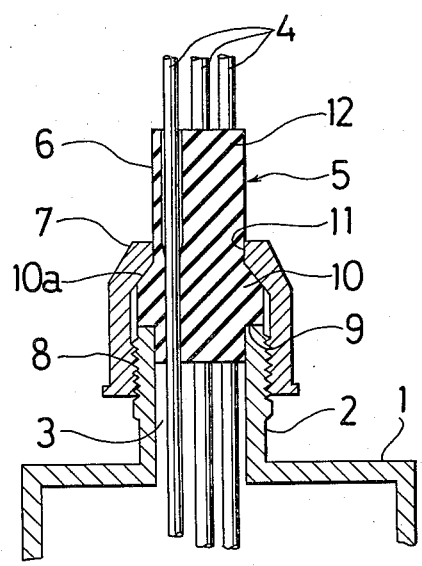
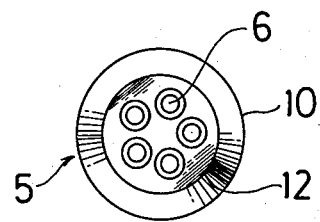
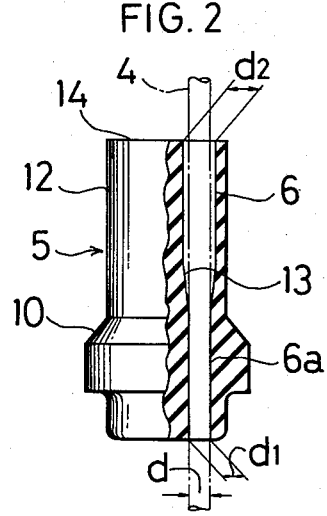
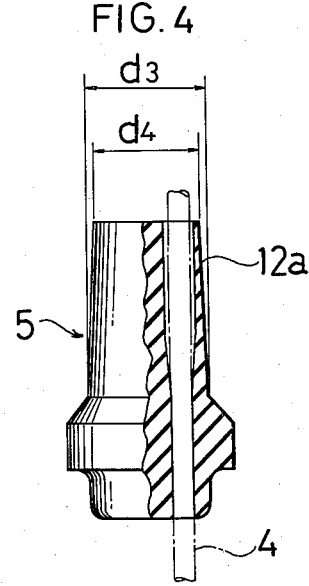
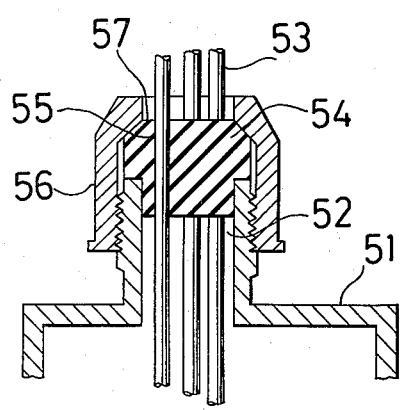
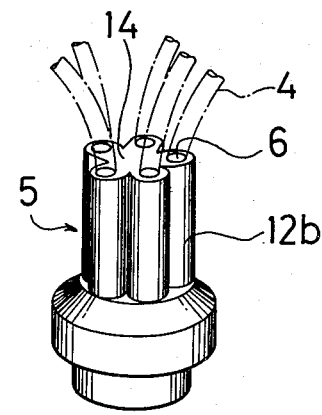
FIG. 6 PRIOR ART

DEVICE FOR SEALING ELECTRIC WIRES

BACKGROUND OF THE INVENTION

This invention relates to a device for liquidsealing relatively thin, electric wires extending through an opening in a casing of a system or apparatus.

As shown in FIG. 6 of the accompanying drawings, a conventional sealing device of this kind includes a flexible or elastic sealing member 54 mounted in an opening 52 in a casing 51 and held under pressure in liquid-tight engagement with the casing 51 by a cap screw 56 which holds the sealing member therewithin. Member 54 has axial bores 55 through which wires 53 extend from the opening 52. Although this device gives a liquid tight seal with each wire tightly compressed, the sealing member 54, when hardened under pressure, may cause the wires, especially when thin, to be broken or cut at the outer surface 57 of the member 54 as the wires move sharply or vibrate.

SUMMARY OF THE INVENTION

A principal object of this invention is to provide a liquid-tight sealing device for wires, which can prevent them from being broken at the end surface of a sealing member of the device.

This and other objects will become apparent from the following detailed description of preferred embodiments of this invention with reference to the accompanying drawings.

BRIEF EXPLANATION OF THE DRAWINGS

FIG. 1 is an elevational view in longitudinal section of a device embodying this invention;

FIG. 2 is an elevational view on a somewhat enlarged scale, partially in section, of a sealing member of the device of FIG. 1;

FIG. 3 is a top plan view of the sealing member of FIG. 2;

FIG. 4 is a view similar to FIG. 1 but showing a modification of the sealing member;

FIG. 5 is a perspective view of another modification of the sealing member; and

FIG. 6 is an elevational view in a longitudinal section of a prior art device.

DETAILED DESCRIPTION OF THE INVENTION

FIG. 1 shows an embodiment of this invention. A casing 1 is part of an electric system apparatus or the like that is designed to be disposed in a liquid under pressure. The casing 1 has a boss 2 outwardly projecting to form an opening 3 through which electric wires 4 pass to and from the system. An elastic or flexible sealing member or element 5, made of rubber for example, has a shoulder or enlargement 10 that liquid-tightly engages at its bottom surface 9 a top surface of the boss 2. The element 5 also has longitudinal or axial bores 6 therein through which the wires 4 pass. A cap screw 7 is threaded around the boss and has a top opening 11. The sealing element 5 includes an outer extension 12 extending longitudinally outwardly from the opening 11 of the cap screw. A base portion of the element 5 is held within cap screw 7, the base portion being formed by the shoulder or radial enlargement 10. The upper portion of the enlargement 10 has an angled face 10a, which mates with an inner angled face in a top portion of the cap screw 7 so that the bottom surface 9 of enlargement 10 is pressed into liquid-tight engagement with the boss 2.

As seen in FIGS. 1–3, the diameter ($d_1$) of the lower or inner portion 6a of each bore 6 is sized to closely fit around the wire, or substantially equals the diameter (d) of the wire, in the lower or base portion of sealing member 5, while the bore 6 has another diameter ($d_2$) larger than the diameter (d) of the wire in an extension portion 12 of the member 5. The two sizes of the bore diameter are interconnected by a tapered or conical wall 13 of the bore. The wire is tight in the bore of the base portion but it is loose in the bore of the extension portion 12. The conical wall 13 meets the small diameter ($d_1$) preferably at or adjacent the level where the outer extension 12 joins enlargement 10 of the base portion and receives pressure from cap screw 7, or somewhat away from that level in the direction of the base portion.

Thus, when the cap screw 7 is threaded onto the boss 2 the base portion of member 5 is compressed into tight engagement with the boss 2 and with the wires 4 to form a liquid-tight seal at the opening 3 of the casing 1. While the base portion becomes hardened or rigid under pressure, the rigidity and the tightness of bores 6 decreases outwardly along the conical wall 13 and becomes zero at the level of the large diameter ($d_2$) of the bores 6. Also, the extension 12, being made of a flexible and somewhat gummy material, can easily radially bend. This prevents the wires from being damaged or broken due to sharp bending movements or vibrations thereof such as those generated by an engine or the like, as is the case at the outer surface of a sealing member of a conventional device.

Furthermore, the large diameter ($d_2$) of the bores 6 facilitates the wires being passed smoothly into the bores from extension 12 of member 5.

FIG. 4 shows a modification of the flexible sealing element 5, the modification includes a frusto-conical extension 12a having a bottom diameter ($d_3$) which is larger than the top diameter ($d_4$) at the outer end. This taper increases the flexibility of the upper portion of the extension 12a to further prevent the wires from being damaged. The tapered shape also facilitates the manufacture of member 5.

FIG. 5 shows another modification of the flexible element 5 wherein an extension 12b is formed with a plurality of parallel columns, each column being semi-circular in radial section and the columns being interconnected or integral at the center of the member 12b. Each of the columns has a bore 6 therein through which a wire 4 can pass. With this arrangement, the wires may be bent radially or swing in a different direction with maximum flexibility and with minimum damage to the wires at the end 14 of the extension 12b.

It is to be noted that the embodiment of FIG. 4 is my preferred form of the invention.

What is claimed is:

1. Apparatus for sealing electric wires to a casing of a system, the casing having an opening therein, said apparatus comprising a cap screw adapted to be threadedly attached to said casing around said opening, said cap screw having a hole therethrough adapted to be aligned with said opening, a flexible and elastic sealing member having formed therein axial bores through which wires are adapted to extend and pass through the opening, said sealing member including a base portion which is embraced within said hole in said cap screw and is adapted to be forced thereby into liquid-tight engagement with the opening of the casing, said sealing member further including an outer extension portion extending from said base portion longitudinally out of said hole of said cap screw, each of said bores extending through both said base portion and said outer extension portion, each of said bores having a small diameter portion in said base portion for tightly receiving a portion of a wire of a given diameter and each of said bores having a larger diameter portion in said extension portion for loosely receiving another portion of such wire, and said small and larger diameter portions of said bores being interconnected by a conical wall portion of said bores.

2. Apparatus according to claim 1, wherein said conical wall portion terminates into said small diameter portion adjacent a level where said extension portion borders said base portion.

3. Apparatus according to claim 1, wherein said extension portion of said sealing member is formed with a plurality of parallel columns semi-circular in radial section and interconnected at the center of said sealing member, each of said columns containing one of said bores through which one of said wires may pass.

4. A sealing member for sealing electric wires and adapted to be used with a cap screw having a hole therethrough, said sealing member being relatively flexible and elastic and having therein axial bores through which the wires are adapted to extend, said sealing member including a base portion and an extension portion extending from said base portion, each of said bores extending through both said base portion and said extension portion, each of said bores having a small diameter portion in said base portion for tightly receiving a portion of a wire of given diameter and each of said bores having a larger diameter portion in said extension portion for loosely receiving another portion of such wire, and said small and larger diameter portions of said bores being interconnected by a conical wall portion of said bores.

5. A sealing member according to claim 4, wherein said conical wall portion terminates into said small diameter portion adjacent a level where said extension portion borders said base portion.

6. A sealing member according to claim 4, wherein said extension portion of said sealing member is formed with a plurality of parallel columns semi-circular in radial section and interconnected at the center of said sealing member, each of said columns containing one of said bores through which one of said wires may pass.

* * * * *